Dec. 9, 1958     J. R. HARCLERODE     2,863,441
MATERIAL CONVEYOR CART FOR MASONRY SAWS
Filed Feb. 4, 1957

INVENTOR.
John Robert Harclerode
BY
ATTORNEY

United States Patent Office

2,863,441
Patented Dec. 9, 1958

2,863,441

MATERIAL CONVEYOR CART FOR MASONRY SAWS

John Robert Harclerode, Kansas City, Mo., assignor to Clipper Manufacturing Company, Kansas City, Mo., a corporation of Missouri Application February 4, 1957, Serial No. 637,949

4 Claims. (Cl. 125—13)

This invention relates to improvements in masonry saws such as disclosed, for example, in Patent No. 2,171,024, issued to N. C. Coates on August 29, 1939, the primary object being to provide a work-supporting cart having means inherent therein for alleviating the problems resulting from severance of parts of the cart by the rotating disc of the machine during normal operation.

Cutting machines of the kind disclosed in said patent by their very nature, present difficult problems so far as the work-supporting cart is concerned because of the fact that it is difficult, if not impossible, to prevent accidental cutting into parts of the cart by virtue of the fact that the rotating cutting disc is mounted for swinging movement toward and away from the work-supporting platform of the cart.

Swinging movement is normally foot-controlled and while a skilled workman is able for the most part to judge distances such as to avoid damage to the cart, nevertheless, since the disc must cut through hard substances, it is still difficult to prevent surging of the high speed disc through the masonry material and into parts of the cart. Such difficulty of controlled operation results in sagging of the cart between the bed rails which support the same and conventional constructions do not permit easy and rapid repair or replacement of parts.

It is the most important object of the present invention, therefore, to provide a masonry cart that includes a framework which in turn supports a replaceable wood platform and including structural components that will not only support the severed parts of the platform, but keep the frame itself from sagging when such frame is cut into by the rotating disc.

Another important object of the present invention is to advantageously use the open framework of the cart as a means for attaching end bars that in turn mount grooved rollers which reciprocate along the bed rails of the machine.

A still further object of the instant invention is to employ the said end bars as a means for mounting a gauge-supporting member, the latter of which is in turn reinforced by a block strategically located within the path of travel of the swingable cutting disc.

Figure 1:
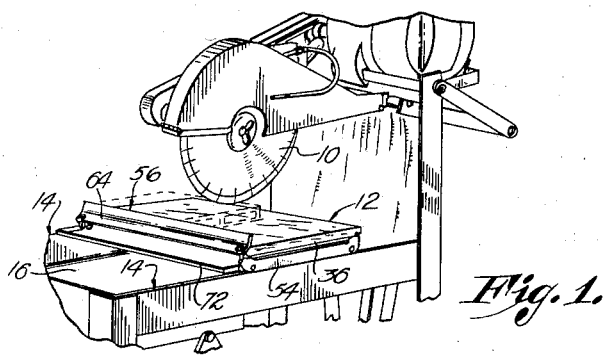
Figure 1 is a fragmentary, perspective view showing the type of masonry saw with which the material conveyor cart of the instant invention is adapted to be used.
Figure 2:
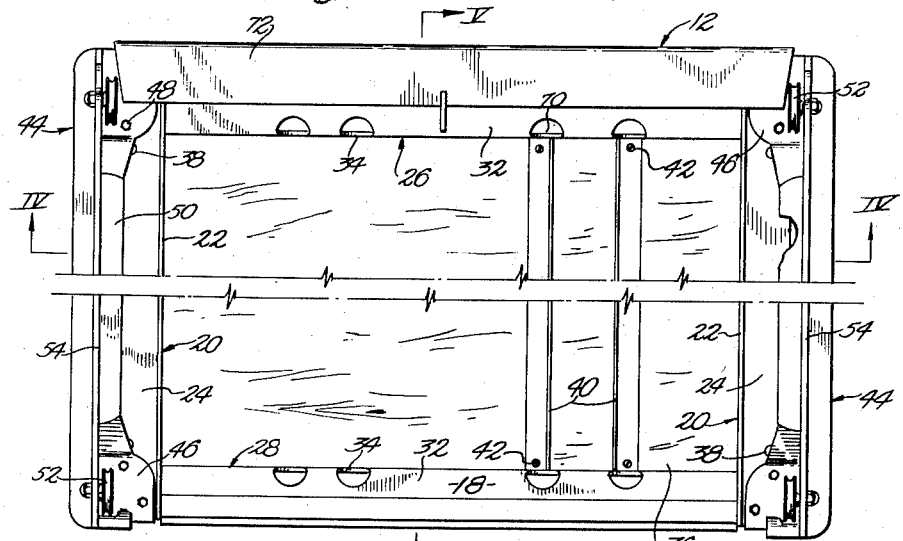
Fig. 2 is an enlarged bottom view of the conveyor cart illustrated in Figure 1.
Figure 3:
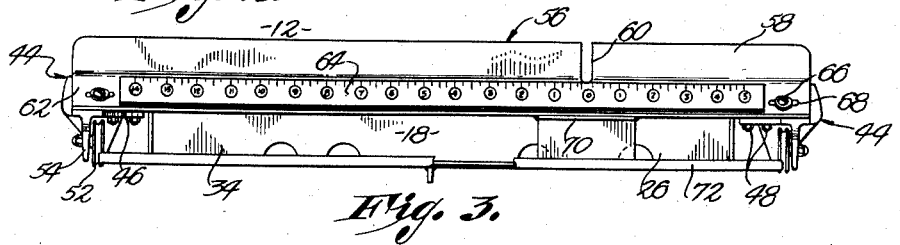
Fig. 3 is a front elevational view of the cart.

As in the cutting machine disclosed by the patent above referred to, the assembly shown in Fig. 1 of the drawing includes a cutting disc 10 mounted for rotation about a horizontal axis and swingable vertically within its plane toward and away from conveyor cart 12 forming the subject matter of the instant invention.

Cart 12 is in turn supported for horizontal reciprocation in the usual manner by bed rails 14 which may, as illustrated, comprise the side walls of a water collection pan 16. In this respect, it is to be pointed out that there is included in the machine a water recirculating system for cooling purposes and such water flowing from the disc 10, from the work itself, and from the cart 12 is collected by pan 16.

Cart 12 includes an open frame broadly designated by the numeral 18 having a pair of end elements 20 that are parallel with the path of reciprocation of the cart 12 along the bed rails 14.

Figure 4:
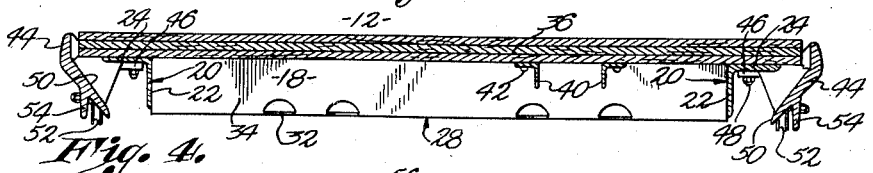
Fig. 4 is a cross-sectional view taken on line IV—IV of Fig. 2 but showing the cart in an upright position.

End elements 20 are L-shaped transversely as seen in Fig. 4, presenting a vertical leg 22 and an outwardly-extending, horizontal leg 24.

Frame 18 includes additionally a front channel member 26 and a rear channel member 28 perpendicular to the elements 20 and disposed between the latter in abutting relationship to the vertical flanges 22 thereof. The ends of the elements 26 and 28 are rigidly attached to the vertical flanges 22 in any suitable manner, preferably by welding.

Figure 5:
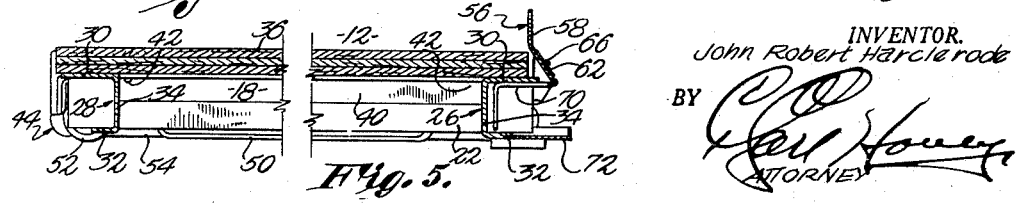
Fig. 5 is an upright, cross-sectional view taken on line V—V of Fig. 2.

The channel members 26 and 28 face oppositely as seen in Fig. 5 and each is provided with an upper horizontal leg 30, a lower outturned, horizontal leg 32 and a vertical bight 34.

The four legs 24—24 and 30—30 are in a common horizontal plane and adapted, therefore, to flatly receive a work-supporting platform 36 preferably made from wood and taking the form of a rectangular panel. Platform 36 is removably secured to the frame 18 by a plurality of fasteners such as screws 38 extending upwardly through the end flanges 24 of elements 20.

The members 26 and 28 are interconnected by a pair of spaced-apart supports 40 having their ends abutting the bights 34 and welded directly thereto. The supports 40 are preferably L-shaped as seen in Fig. 4, and platform 36 is attached to the horizontal legs of the supports 40 by a plurality of screws or other fasteners 42 that extend into the lower surface of the platform 36 in the same manner as fasteners 38.

The frame 18 and particularly the outturned flanges 24 thereof, are especially adapted for mounting on a pair of elongated roller supports 44, each of which has a small integral plate 46 removably secured to the lower face of the corresponding flange 24 by bolts or the like 48.

The supports 44 are in embracing relationship to the ends of the platform 36 and spaced therefrom as seen in Fig. 4, for receiving the cooling water flowing from the upper surface of platform 36 and directing such water to the pan 16. To this end, each support 44 has a downwardly and inwardly flared apron 50 underlying the platform 36 above the bed rails 14 to clear the latter when the same support the car 12 through the medium of a plurality of grooved rollers 52 secured to vertical lip 54 forming an integral part of the supports 44. It is thus seen that each support 44 may be formed into a single casting, presenting the aprons 50, lips 54 and plates 46.

The forwardmost ends of the supports 44 are in turn adapted to mount a combination back-up plate and gauge-supporting bar 56. The work back-up leg 58 of bar 56 is provided with a slot 60 for clearing disc 10 inasmuch as the leg 58 extends upwardly beyond the upper plane of the platform 36 as seen in Fig. 5. Downwardly and forwardly extending leg 62 of the bar 56 mounts a gauge 64 and bar 56 is releasably secured to the supports 44 by fasteners 66. It is to be noted that leg 62 is provided with slots 68 which receive the fasteners 66 and permit adjustment of the bar 56 so as to properly align the slots 60 with the disc 10.

A relatively heavy block or the like 70 directly beneath the slot 60 is welded rigidly to the lowermost edge of the flange 62 and inasmuch as the block 70 is L-shaped, as seen in Fig. 5, it extends rearwardly from the flange 62 into the forwardly-opening front channel 26 of frame 18. By virtue of such construction, the operator may hold relatively thin work in place on table 36 against the back 58 by gripping the same with his thumb beneath member 70 and his fingers overlapping the work.

A relatively shallow trough or tray 72, preferably sloping downwardly and inwardly toward the water collection pan 16, underlies the bar 56 and, therefore, flange 30 of channel 26 for collecting water draining from the proximal longitudinal edge of platform 36, tray 72 being rigidly attached to the outermost edge of the flange 32 of channel 26 as seen in Fig. 5.

From the foregoing it is readily apparent that all metallic parts of the cart 12, except flange 58, are disposed below the upper plane of the wood platform 36 and that since a clearance slot 60 is provided in the flange 58, no damage will occur to the cart 12 as long as the operator maintains the disc 10 out of engagement with the table 36. By the same token, shallow kerfs cut into the platform 36 transversely thereof will have little deleterious effect even if the same are so deep as to cut into the flange 62 and eventually the gauge plate 64.

On the other hand, when such cutting into the platform 36 becomes so deep as to sever the latter into two separate parts, there will still be no sagging of the cart 12 nor displacement of the bar 56 or the gauge 64. In fact, flanges 30 of channels 26 and 28 may be severed without adversely affecting the bar 56 since the block 70 will still hold the two sections of the severed flange 62 interconnected.

It is to be noted that when the disc 10 cuts through the platform 36 and through the flanges 30, as well as into the bights 34, disc 10 is embraced by the spaced-apart supports 40 and inasmuch as the latter bridge the distance between bights 34 and are connected to the platform 36 by fasteners 42, supports 40 will not only hold the severed sections of platform 36 together and in a horizontal plane, but will prevent downward bowing or sagging of the frame 18 by virtue of the weakening of the channels 26 and 28. It is thus seen that the cart may be damaged even to the extent of a substantial severance of the bight 34 of channel 28 before repair becomes necessary, and in this respect, the block 70 tends to deflect the disc 10 to thereby not only hold the bar 56 together, but protect the vertical bight 34 of channel 26.

In any event, after the platform 36 has become excessively damaged or severed into two parts, it may be replaced easily and quickly by simply removing the fasteners 38 and 42.

Having thus described the invention what is claimed as new and desired to be secured by Letters Patent is:

1. For a masonry saw having a pair of bed rails and a vertically swingable cutting disc rotatable about a horizontal axis, a conveyor cart adapted for reciprocation along said rails beneath the disc and including an open frame having a pair of end elements parallel with the path of reciprocation of the cart, a front channel and a rear channel, each having a pair of horizontal legs and a vertical bight; a work-supporting platform mounted on the frame; and a pair of spaced supports secured to the platform therebeneath and interconnecting said bights of the channels, said supports embracing the disc when the latter severs the platform and cuts into said channels, whereby to hold the cart against sagging between said rails.

2. For a masonry saw having a pair of bed rails and a vertically swingable cutting disc rotatable about a horizontal axis, a conveyor cart adapted for reciprocation along said rails beneath the disc and including an open frame having a pair of end elements parallel with the path of reciprocation of the cart, a front channel and a rear channel, each having a pair of horizontal legs and a vertical bight; a work-supporting platform mounted on the frame; a pair of spaced supports secured to the platform therebeneath and interconnecting said bights of the channels, said supports embracing the disc when the latter severs the platform and cuts into said channels, whereby to hold the cart against sagging between said rails; and an elongated roller support secured to each element respectively and provided with grooved, rail-engaging rollers.

3. For a masonry saw having a pair of bed rails and a vertically swingable cutting disc rotatable about a horizontal axis, a conveyor cart adapted for reciprocation along said rails beneath the disc and including an open frame having a pair of end elements parallel with the path of reciprocation of the cart, a front channel and a rear channel, each having a pair of horizontal legs and a vertical bight; a work-supporting platform mounted on the frame; a pair of spaced supports secured to the platform therebeneath and interconnecting said bights of the channels, said supports embracing the disc when the latter severs the platform and cuts into said channels, whereby to hold the cart against sagging between said rails; an elongated roller support secured to each element respectively and provided with grooved, rail-engaging rollers; a gauge-supporting bar along said front channel and secured to said rail supports; and a block attached to said bar within the path of the disc for holding the bar together when severed by the disc.

4. For a cutting machine having a rotatable saw swingable in a vertical plane, a conveyor cart adapted for disposition within the swinging path of said saw and including an open frame; a work-supporting platform mounted on said frame; a pair of spaced supports secured to the frame for holding the platform against sagging upon severance of the latter by said saw, said supports being on opposite sides of said plane, and being spaced laterally from the saw when the latter severs the platform whereby the saw cannot cut the supports; a gauge-supporting bar along one edge of said platform; means mounting the bar on the frame; and an element attached to said bar within the path of the saw for holding the bar together when severed by the saw.

References Cited in the file of this patent

UNITED STATES PATENTS 2,213,011     Martin                 Aug. 27, 1940